(12) United States Patent
Jang et al.

(10) Patent No.: US 8,155,231 B2
(45) Date of Patent: Apr. 10, 2012

(54) APPARATUS AND METHOD FOR SELECTING ANTENNA IN AN ORTHOGONALIZED SPATIAL MULTIPLEXING SYSTEM

(75) Inventors: Kyung-Hun Jang, Suwon-si (KR); In-Kyu Lee, Seoul (KR); Dong-Jun Lee, Seoul (KR); Heun-Chul Lee, Pocheon-si (KR); Jung-Hoon Suh, Yongin-si (KR); Young-Soo Kim, Seoul (KR); Hyo-Sun Hwang, Seoul (KR)

(73) Assignees: Samsung Electronics Co., Ltd, Suwon-Si (KR); Korea University Industrial & Academic Collaboration Foundation, Seoul (KR)

( * ) Notice: Subject to any disclaimer, the term of this patent is extended or adjusted under 35 U.S.C. 154(b) by 719 days.

(21) Appl. No.: 11/850,301

(22) Filed: Sep. 5, 2007

(65) Prior Publication Data
US 2008/0056402 A1 Mar. 6, 2008

(30) Foreign Application Priority Data
Sep. 6, 2006 (KR) .................. 10-2006-0085714

(51) Int. Cl.
*H04B 7/02* (2006.01)

(52) U.S. Cl. ........ 375/267; 375/299; 375/347; 375/216; 375/260; 455/69; 455/101; 455/102

(58) Field of Classification Search .................. 375/267, 375/299, 347, 216, 260; 455/69, 101, 102
See application file for complete search history.

(56) References Cited

U.S. PATENT DOCUMENTS

| 6,298,092 | B1 * | 10/2001 | Heath et al. ................... 375/267 |
| 6,763,073 | B2 | 7/2004 | Foschini et al. |
| 6,804,312 | B1 * | 10/2004 | Win et al. ..................... 375/347 |
| 7,109,919 | B2 * | 9/2006 | Howell ......................... 342/372 |
| 7,149,547 | B2 * | 12/2006 | Katz et al. ................. 455/562.1 |
| RE40,056 | E * | 2/2008 | Heath et al. ................... 375/267 |
| 7,372,912 | B2 * | 5/2008 | Seo et al. ..................... 375/267 |

(Continued)

FOREIGN PATENT DOCUMENTS

KR 19990083226 A 11/1999

(Continued)

OTHER PUBLICATIONS

R. Heath, et al., "Multimode Antenna Selection for Spatial Multiplexing Systems With Linear Receivers", IEEE Transactions on Signal Processing, vol. 53, No. 8, Aug. 2005, pp. 3042-3056.

(Continued)

*Primary Examiner* — Kenneth Lam
(74) *Attorney, Agent, or Firm* — Sughrue Mion, PLLC

(57) ABSTRACT

A method for selecting an antenna in an orthogonalized spatial multiplexing system. Upon receipt of at least one symbol from a transmitter via multiple receive antennas, a receiver decodes each of the received symbols; determines a rotation angle between the received symbols, and selects an optimal subset of transmit antennas using a distance between vectors of the decoded symbols; generates feedback information including the determined rotation angle and the selected optimal subset, and transmits the generated feedback information to the transmitter. Upon receipt of the feedback information, the transmitter beam-forms an antenna corresponding to the optimal subset depending on the received feedback information, and transmits a data symbol to the receiver. The receiver detects each of data symbols received from the transmitter.

11 Claims, 9 Drawing Sheets

U.S. PATENT DOCUMENTS

| | | | |
|---|---|---|---|
| 7,738,583 B2* | 6/2010 | Kim | 375/267 |
| 7,773,694 B2* | 8/2010 | Murakami et al. | 375/299 |
| 2004/0136349 A1 | 7/2004 | Walton et al. | |
| 2005/0053169 A1 | 3/2005 | Jia et al. | |
| 2005/0090205 A1* | 4/2005 | Catreux-Erceg et al. | 455/78 |
| 2005/0163243 A1 | 7/2005 | Chung et al. | |
| 2005/0281322 A1 | 12/2005 | Lee et al. | |
| 2006/0056335 A1* | 3/2006 | Lin et al. | 370/328 |
| 2006/0212774 A1* | 9/2006 | Lee et al. | 714/755 |
| 2006/0239374 A1* | 10/2006 | Aldana et al. | 375/267 |
| 2006/0291544 A1* | 12/2006 | Fischer et al. | 375/219 |
| 2007/0019748 A1* | 1/2007 | Hoo et al. | 375/260 |
| 2007/0127586 A1* | 6/2007 | Hafeez | 375/267 |
| 2007/0237252 A1* | 10/2007 | Li | 375/264 |
| 2007/0274411 A1* | 11/2007 | Lee et al. | 375/267 |
| 2008/0108310 A1* | 5/2008 | Tong et al. | 455/69 |
| 2009/0316307 A1* | 12/2009 | Olesen et al. | 360/267 |

FOREIGN PATENT DOCUMENTS

| | | |
|---|---|---|
| KR | 1020050065065 A | 6/2005 |
| KR | 1020060045640 A | 5/2006 |

OTHER PUBLICATIONS

Communication dated Nov. 30, 2011 issued by the Korean Intellectual Property Office in counterpart Korean Patent Application No. 10-2006-0085714.

* cited by examiner

APPARATUS AND METHOD FOR SELECTING ANTENNA IN AN ORTHOGONALIZED SPATIAL MULTIPLEXING SYSTEM

PRIORITY

This application claims the benefit under 35 U.S.C. §119(a) of a Korean Patent Application filed in the Korean Intellectual Property Office on Sep. 6, 2006 and assigned Serial No. 2006-85714, the disclosure of which is incorporated herein by reference.

BACKGROUND OF THE INVENTION

1. Field of the Invention

The present invention relates generally to an apparatus and method for selecting antennas in a Multi-Input Multi-Output (MIMO) system, and in particular, to an apparatus and method for selecting antennas in an Orthogonalized Spatial Multiplexing (OSM) system.

2. Description of the Related Art

Generally, MIMO systems provide very important means to increase the spectral efficiency for wireless systems. Particularly, spatial multiplexing schemes enable extremely high spectral efficiencies by transmitting independent streams of data simultaneously through multiple transmit antennas. In order to fully exploit the potential of multiple antennas, a receiving entity can apply full Channel State Information (CSI) knowledge to a transmitting entity optimize a transmission scheme according to current channel conditions.

Based on knowledge of the full CSI at a transmitter, a basic idea of preceding has been proposed. Most work on these closed-loop MIMO systems is carried out by obtaining Singular Value Decomposition (SVD) of the channel transfer matrix.

It is well known that the optimum linear precoder and decoder decouple the MIMI channel into several independent eigen subchannels and allocate resources such as power and bits over theses subchannels.

More realistic assumptions about CSI at the transmitter and the receiver can impact the potential channel gain of MIMO systems. While CSI can be acquired at the transmitter by assuming channel reciprocity between uplink and downlink transmission in Time Division Duplex (TDD) systems, more often CSI needs to be obtained at the receiver and sent back to the transmitter over a reliable feedback channel.

However, in practical situations, the amount of feedback from the receiver to the transmitter should be kept as small as possible to minimize the overhead. In this sense, the assumption of full channel knowledge at the transmitter is not realistic, since even under flat-fading MIMO channels, the feedback requirements generally grow with the number of transmit antennas, receive antennas, and users. Another drawback of preceding systems is that the SVD operation requires high computational complexity and is known to be numerically sensitive.

To address these issues, the transmitter with limited feedback information in a communication system tries to utilize the system resources more efficiently. The transmitter precoder is chosen from a finite set of preceding matrices (hereinafter, called 'codebook'), known to both the receiver and the transmitter. The receiver selects the optimal precoder from the codebook with a selection criterion based on the current CSI, and reports the index of this matrix to the transmitter over a limited feedback channel.

Recently, a new spatial multiplexing scheme, called Orthogonalized Spatial Multiplexing (OSM), for a closed-loop MIMO system, has been proposed, which allows a simple Maximum-Likelihood (ML) receiver. The interest is restricted to spatial multiplexing systems transmitting two independent data streams, which are important in practical wireless system designs. The ML Decoding (MLD) is optimal for detecting symbols in MIMO Spatial Multiplexing (SM) systems. However, its computational complexity exponentially increases with the number of transmit antennas and the size of constellations.

SUMMARY OF THE INVENTION

An aspect of the present invention is to address at least the problems and/or disadvantages and to provide at least the advantages described below. Accordingly, an aspect of the present invention is to provide an apparatus and method for selecting antennas in a Spatial Multiplexing (SM) system that requires only a single phase value from an ML receiver to reduce the processing complexity of the receiver.

Another aspect of the present invention is to provide single-symbol decodable spatial multiplexing apparatus and method based on phase feedback by introducing a real-valued representation for complex-valued MIMO systems to simplify the MLD.

According to one aspect of the present invention, there is provided a method for selecting an antenna of a transmitter by a receiver in an orthogonalized spatial multiplexing system. The antenna selection method includes, upon receipt of at least one symbol from the transmitter with multiple antennas, decoding each of the received symbols; determining a rotation angle between the received symbols, and selecting an optimal subset of transmit antennas using the determined rotation angle and a distance between the decoded symbols; and generating feedback information including the determined rotation angle and the selected optimal subset, and transmitting the generated feedback information to the transmitter.

According to another aspect of the present invention, there is provided an apparatus for selecting an antenna of a transmitter in a receiver of an orthogonalized spatial multiplexing system. The antenna selection apparatus includes at least one decoder for, upon receipt of at least one symbol from the transmitter with multiple antennas, decoding the received symbols; and an antenna selector for determining a rotation angle between the decoded symbols, selecting an optimal subset of transmit antennas using a Euclidean distance between vectors of the decoded symbols, generating feedback information including the determined rotation angle and the selected optimal subset, and transmitting the generated feedback information to the transmitter.

According to further another aspect of the present invention, there is provided a method for selecting an antenna in an orthogonalized spatial multiplexing system. The antenna selection method includes, upon receipt of at least one symbol from a transmitter via multiple receive antennas, decoding by a receiver each of the received symbols; determining a rotation angle between the received symbols, and selecting an optimal subset of transmit antennas using a distance between vectors of the decoded symbols; generating feedback information including the determined rotation angle and the selected optimal subset, and transmitting the generated feedback information to the transmitter; upon receipt of the feedback information, beam-forming by the transmitter an antenna corresponding to the optimal subset depending on the received feedback information, and transmitting a data symbol to the receiver; and detecting by the receiver each of data symbols received from the transmitter.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
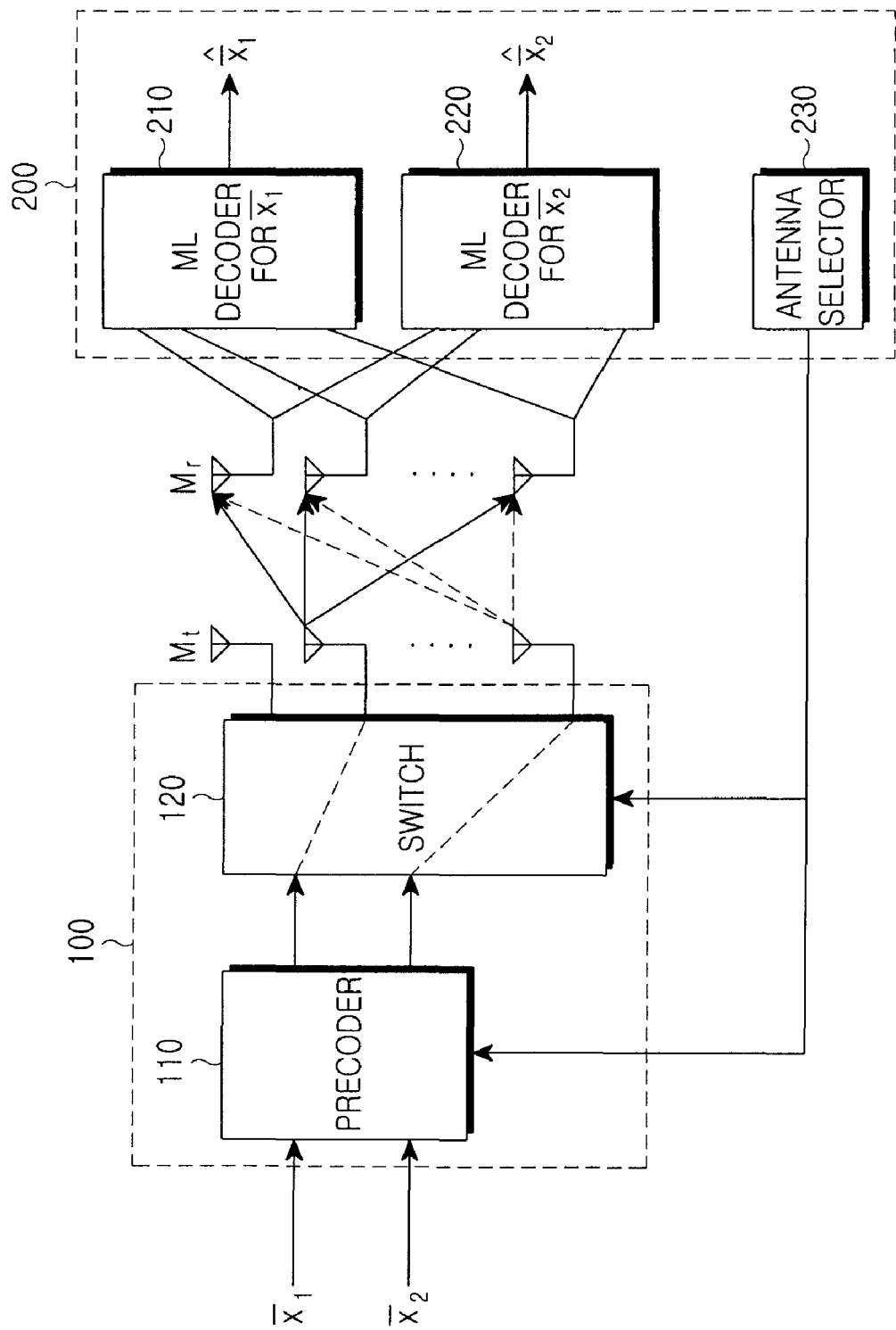
FIG. 1 illustrates a limited feedback MIMO system according to an embodiment of the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The summary of the present invention will first be described. The present invention extends the proposed spatial multiplexing scheme to systems with a larger number of transmit antennas. When there are more than two transmit antennas, the new scheme provided by the present invention needs to choose the two best antennas to maximize the performance. The transmit antenna subset selection can be viewed as another example of limited feedback precoding, where the optimal subset of transmit antennas is determined and conveyed to the transmitter. Simultaneous transmission from all available transmit antennas may incur too much burden on system complexity due to the increased number of Radio-Frequency (RF) chains. To reduce the cost, a selection criterion based on the output Signal-to-Noise Ratio (SNR) is proposed for spatial multiplexing systems with linear receivers in various manners.

The present invention should consider a criterion based on the minimum Euclidean distance for selecting the optimal subset of multiple transmit antennas in the spatial multiplexing systems proposed by the present invention, since the Euclidean distance between received vectors accounts for the symbol error probability.

Although the computation of the minimum Euclidean distance requires a full search over the multidimensional constellation in the conventional spatial multiplexing systems, the spatial multiplexing schemes proposed by the present invention allow a simple search over a small number of constellation pairs.

Throughout the specification of the present invention, normal letters represent scalar quantities, boldface letters indicate vectors, and boldface uppercase letters designate matrices. With a bar accounting for complex variables, for any complex notation $\bar{c}$, the real and imaginary parts of $\bar{c}$ are denoted by $\Re[\bar{c}]$ and $\Im[\bar{c}]$, respectively. In addition, the two-dimensional complex transmitted signal vector is defined as $\bar{x}$, and the Mr-dimensional complex received signal vector is defined as $\bar{y}$.

Regarding the simulation results of the present invention, a comparison will be made between the performance of the proposed scheme with the performance of other closed loop systems such as the optimal unitary precoding and the optimal linear precoding over flat-fading quasistatic channels in terms of Bit Error Rate (BER).

With reference to the accompanying drawings, a description of the present invention will now be made of an apparatus and method for selecting antennas in an Orthogonalized Spatial Multiplexing system according to an embodiment of the present invention.

FIG. 1 illustrates a limited feedback MIMO system according to an embodiment of the present invention.

As illustrated in FIG. 1, the present invention includes a transmitter 100 with $M_t$ transmit antennas, and a receiver 200 with $M_r$ receive antennas. In addition, the present invention assumes a Spatial Multiplexing (SM) system with $M_t$ transmit antennas and $M_r$ receive antennas, where two independent eigen modes are considered. The general data path for the proposed MIMO transmission is shown in FIG. 1. Two input symbols $\bar{x}_1$ and $\bar{x}_2$ are precoded by the function $F(\bar{x},\theta)$ in a precoder 110 of the transmitter 100, and are transmitted over two transmit antennas out of $M_t$ transmit antennas after being switched by means of a switch 120. The transmitted symbols are received at the receiver 200 via $M_r$ receive antennas, and then decoded by means of decoders 210 and 220 for the two input symbols $\bar{x}_1$ and $\bar{x}_2$, respectively.

The optimal selection of two transmit antennas is made based on the minimum Euclidean distance, since the Euclidean distance accounts for the performance of the ML receiver at a high SNR. That is, an antenna selector 230 included in the receiver 200 calculates a rotation angle θ, and selects antennas based on the minimum Euclidean distance. The antenna selector 230 provides feedback information including information on the calculated rotation angle θ and the selected optimal antennas, to the precoder 110 and the switch 120 in the transmitter 100.

Upon receipt of data symbols from the transmitter 100 after transmitting the feedback information to the transmitter 100, the decoders 210 and 220 in the receiver 200 each detect the received data symbols.

Figure 2:
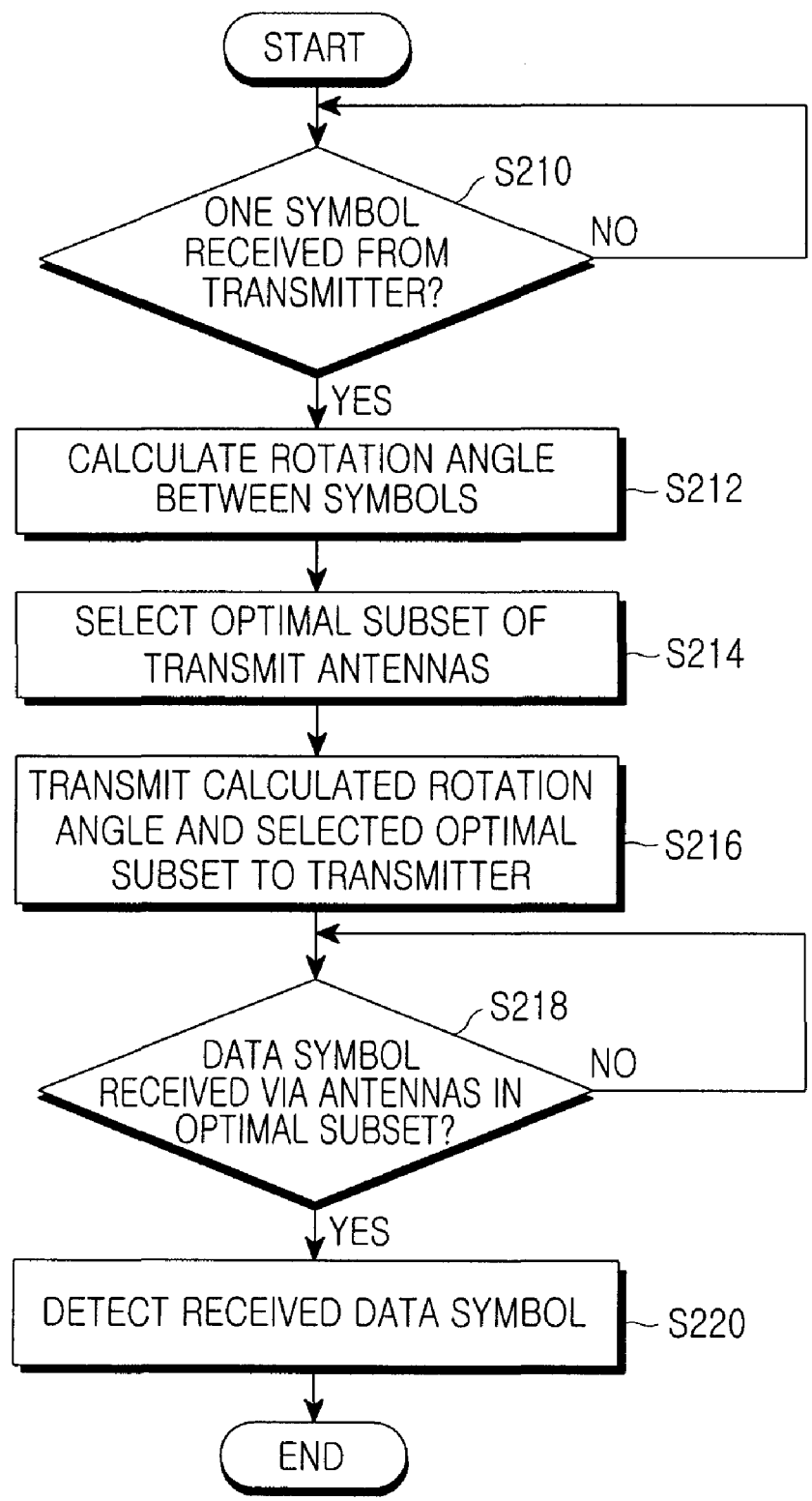
FIG. 2 illustrates a method for selecting antennas in an Orthogonalized Spatial Multiplexing system according to an embodiment of the present invention.

FIG. 2 illustrates a method for selecting antennas in an Orthogonalized Spatial Multiplexing system according to an embodiment of the present invention.

Referring to FIG. 2, upon receipt of at least one symbol from a transmitter (Step S210), a receiver calculates a rotation angle depending on the received symbols (Step S212). The receiver selects an optimal subset of transmit antennas depending on the Euclidean distance (Step S214), and transmits, to the transmitter, feedback information including information on the calculated rotation angle and the selected optimal subset of transmit antennas (Step S216). Upon receipt of the feedback information, the transmitter beam-forms transmit antennas using the optimal subset selected by the receiver, and transmits data symbols via the beam-formed antennas. Thereafter, upon receipt of the data symbols from the transmitter via the antennas corresponding to the optimal subset (Step S218), the receiver detects each of the received data symbols (Step S220).

With reference to FIGS. 1 and 2, a detailed description will now be made of a process of calculating a rotation angle and selecting optimal antennas at a receiver using several equations.

A. Orthogonalized Spatial Multiplexing Scheme

The present invention will consider a Spatial Multiplexing (SM) system with two transmit antennas and $M_r$ receive antennas. It is assumed herein that the elements of the MIMO channel matrix are obtained from an independent and identically distributed (i.i.d) complex Gaussian distribution. Each channel realization is assumed to be known at the receiver. Generally, the complex signal received at the receiver is given by $$\bar{y} = \bar{H}\bar{x} + \bar{n} \quad (1)$$

where $\bar{n}$ is a complex Gaussian noise vector with covariance matrix $\sigma_n^2 I_{M_r}$ and $I_d$ indicates an identity matrix of size d. Here the channel response matrix can be written as $$\bar{H} = \begin{bmatrix} \bar{h}_{11} & \cdots & \bar{h}_{12} \\ \vdots & \ddots & \vdots \\ \bar{h}_{M_r 1} & \cdots & \bar{h}_{M_r 2} \end{bmatrix}$$

where $\bar{h}_{ji}$ represents the channel response between the $i^{th}$ transmit antenna and the $j^{th}$ receive antenna.

Let Q denote a signal constellation of size $M_c$. Given the channel matrix $\bar{H}$, the ML estimate of the transmitted vector $\bar{x}$ is given by $$\hat{\bar{x}} = [\hat{\bar{x}}_1 \ \hat{\bar{x}}_2]^t = \arg\min_{\bar{x} \in Q^2} \|\bar{y} - \bar{H}\bar{x}\|^2 \quad (2)$$

where $[\cdot]^t$ indicates the transpose of a vector or matrix, and $\|\cdot\|$ denotes the Euclidean norm. It is noted that the computational complexity of the ML decoding is exponential in the number of constellation points.

Equivalently, the real-valued representation of Equation (1) can be written as $$y = \begin{bmatrix} \Re[\bar{y}] \\ \Im[\bar{y}] \end{bmatrix} = Hx + n \quad (3)$$

where $x=[\Re[\bar{x}^t] \ \Im[\bar{x}^t]]^t$, $n=[\Re[\bar{n}^t] \ \Im[\bar{n}^t]]^t$, and H is $$H = \begin{bmatrix} \Re[\bar{H}] & -\Im[\bar{H}] \\ \Im[\bar{H}] & \Re[\bar{H}] \end{bmatrix} = \begin{bmatrix} \Re[\bar{h}_{11}] & \Re[\bar{h}_{12}] & -\Im[\bar{h}_{11}] & -\Im[\bar{h}_{12}] \\ \vdots & \vdots & \vdots & \vdots \\ \Re[\bar{h}_{M_r 1}] & \Re[\bar{h}_{M_r 2}] & -\Im[\bar{h}_{M_r 1}] & -\Im[\bar{h}_{M_r 2}] \\ \Im[\bar{h}_{11}] & \Im[\bar{h}_{12}] & \Re[\bar{h}_{11}] & \Re[\bar{h}_{12}] \\ \vdots & \vdots & \vdots & \vdots \\ \Im[\bar{h}_{M_r 1}] & \Im[\bar{h}_{M_r 2}] & \Re[\bar{h}_{M_r 1}] & \Re[\bar{h}_{M_r 2}] \end{bmatrix} = [h_1 \ h_2 \ h_3 \ h_4] \quad (4)$$

where n is a real Gaussian noise vector with a covariance matrix $$\frac{\sigma_n^2}{2} I_{2M_r}.$$

Based on the real-valued representation in Equation (3), the ML solution $\hat{x}$ to Equation (2) can be alternatively obtained by $$\hat{x} = [\hat{x}_1 \ \hat{x}_2]^t = \arg\min_{\bar{x} \in Q^2} \left\| y - H \begin{bmatrix} \Re[\bar{x}] \\ \Im[\bar{x}] \end{bmatrix} \right\|^2 \quad (5)$$

It is noted that the ML estimation metrics of Equation (2) and Equation (5) require the same amount of computation.

In what follows, the present invention presents the OSM to simplify the ML decoding. To achieve this goal, the present invention encodes the two transmitted symbols as $$F(\bar{x}, \theta) = \begin{bmatrix} 1 & 0 \\ 0 & \exp(j\theta) \end{bmatrix} s(\bar{x}) \quad (6)$$

where the rotation angle $\theta$ that the receiver desires to find is given by Equation (7). The rotation angle $\theta$ is found depending on magnitude and phase of a complex number between two symbols received from the transmitter.

$$\theta = \tan^{-1}\left(\frac{B}{A}\right) \pm \frac{\pi}{2} \quad (7)$$

with $$A = \sum_{m=1}^{M_r} |\bar{h}_{m1}||\bar{h}_{m2}|\sin(\angle \bar{h}_{m2} - \angle \bar{h}_{m1})$$

and $$B = \sum_{m=1}^{M_r} |\bar{h}_{m1}||\bar{h}_{m2}|\cos(\angle \bar{h}_{m2} - \angle \bar{h}_{m1}),$$

and $$s(\bar{x}) \triangleq \begin{bmatrix} \Re[\bar{x}_1] + j\Re[\bar{x}_2] \\ \Im[\bar{x}_1] + j\Im[\bar{x}_2] \end{bmatrix}.$$

With the above preceding, the original system model in Equation (1) is transformed into $$\bar{y} = \bar{H} F(\bar{x}, \theta) + \bar{n} = \bar{H}_\theta s(\bar{x}) + \bar{n} \quad (8)$$

where $$H_\theta = H \begin{bmatrix} 1 & 0 \\ 0 & \exp(j\theta) \end{bmatrix}.$$

Here $\overline{H}_\theta$ accounts for the effective channel matrix for $s(\overline{x})$. Then, the real-valued system model corresponding to Equation (8) can be represented as $$y = \begin{bmatrix} \Re[\overline{y}] \\ \Im[\overline{y}] \end{bmatrix} \tag{9}$$

$$= \begin{bmatrix} \Re[\overline{H}_\theta] & -\Im[\overline{H}_\theta] \\ \Im[\overline{H}_\theta] & \Re[\overline{H}_\theta] \end{bmatrix} \begin{bmatrix} \Re[s\overline{x}] \\ \Im[s\overline{x}] \end{bmatrix} + \begin{bmatrix} \Re[\overline{n}] \\ \Im[\overline{n}] \end{bmatrix}$$

$$= \begin{bmatrix} h_1^\theta & h_2^\theta & h_3^\theta & h_4^\theta \end{bmatrix} \begin{bmatrix} \Re[\overline{x}_1] \\ \Im[\overline{x}_1] \\ \Re[\overline{x}_2] \\ \Im[\overline{x}_2] \end{bmatrix} + n$$

where the real column vector $h_i^\theta$ of length $2M_r$ denotes the $i^{th}$ column of the effective real-valued channel matrix.

It is noticed that the subspace spanned by $h_1^\theta$ and $h_2^\theta$ becomes orthogonal to that spanned by $h_3^\theta$ and $h_4^\theta$. In this case, as shown in Equation (10) and Equation (11), utilizing this orthogonality, the ML solution $\hat{\overline{x}} = [\hat{\overline{x}}_1\ \hat{\overline{x}}_2]^t$ in Equation (5) can be individually given by $$\hat{\overline{x}}_1 = \underset{\overline{x} \in Q}{\arg\min} \left\| y - [h_1^\theta\ h_2^\theta] \begin{bmatrix} \Re[\overline{x}] \\ \Im[\overline{x}] \end{bmatrix} \right\|^2 \tag{10}$$

and $$\hat{\overline{x}}_2 = \underset{\overline{x} \in Q}{\arg\min} \left\| y - [h_3^\theta\ h_4^\theta] \begin{bmatrix} \Re[\overline{x}] \\ \Im[\overline{x}] \end{bmatrix} \right\|^2 \tag{11}$$

It is noted that in determining $\hat{\overline{x}}_1$ and $\hat{\overline{x}}_2$ in Equation (10) and Equation (11), the size of the search set reduces to Q. These ML decoding equations show that with the proposed transmission scheme, the ML decoding at the receiver can be done by searching for a single symbol (called single-symbol decodable), while the traditional ML decoding in Equation (2) requires searching a pair of symbols. Therefore, in the proposed spatial multiplexing system, the decoding complexity reduces from $O(M_c^2)$ to $O(M_c)$, where the complexity accounts for the number of search candidates in the ML decoding.

B. Antenna Selection Scheme

In the previous section, the review was made on the OSM scheme with two transmit antennas. Now the present invention will extend the proposed scheme to systems with more than two transmit antennas. To this end, the invention introduces a simplified antenna selection method for the proposed spatial multiplexing system. The specification will first give a description of a criterion based on the minimum Euclidean distance between received vectors, and then show that the proposed spatial multiplexing scheme substantially reduces the size of subsets to search for difference vectors, depending on the channel's geometrical properties.

As described above, the system having a transmitter with more than two transmit antennas is shown in FIG. 1, and let $P(M_t, 2)$ denote the set of all possible $$\binom{M_t}{2} = \frac{M_t(M_t - 1)}{2}$$

subsets out of $M_t$ transmit antennas. For a subset $P \in P(M_t, 2)$, the receive constellation is defined as $\{\overline{H}_P^\theta s(\overline{x}) | \overline{x} \in Q^2\}$ where $\overline{H}_P^\theta$ denotes the $M_r \times 2$ virtual channel matrix corresponding to the transmit antenna subset P. Then, there is a need to determine the optimum subset P whose squared minimum distance $d_{min}^2(P)$ between transmitted vectors $\overline{x}_c$ and $\overline{x}_e$ is the greatest. The $d_{min}^2(P)$ compute as $$d_{min}^2(P) = \min_{\overline{x}_c, \overline{x}_e \in Q^2} \left\| \overline{H}_P^\theta s(\overline{x}_c - \overline{x}_e) \right\|^2 \tag{12}$$

$$= \min_{\overline{x}_c, \overline{x}_e \in Q^2} \left\| [h_{P,1}^\theta\ h_{P,2}^\theta\ h_{P,3}^\theta\ h_{P,4}^\theta] \begin{bmatrix} \Re[\overline{x}_{1,c} - \overline{x}_{1,e}] \\ \Im[\overline{x}_{1,c} - \overline{x}_{1,e}] \\ \Re[\overline{x}_{2,c} - \overline{x}_{2,e}] \\ \Im[\overline{x}_{2,c} - \overline{x}_{2,e}] \end{bmatrix} \right\|^2$$

where $h_{P,i}^\theta$ is the $i^{th}$ column of the real-valued representation of $\overline{H}_P^\theta$. Since the computation of $d_{min}^2(P)$ involves all possible pairs of $\overline{x}_c$ and $\overline{x}_e$, the conventional spatial multiplexing systems require a search over $$\binom{M_c^2}{2} = \frac{M_c^2(M_c^2 - 1)}{2}$$

vectors.

In the following, it is shown that the proposed spatial multiplexing can obtain the minimum distance in a much simpler form. It is noted that the subspace spanned by $h_{P,1}^\theta$ and $h_{P,2}^\theta$ is orthogonal to that spanned by $h_{P,3}^\theta$ and $h_{P,4}^\theta$. Because $h_{P,2}^\theta$ and $h_{P,4}^\theta$ are orthogonal to each other, Equation (12) can expressed as Equation (13). Also, in this case, assuming that two symbols $\overline{x}_1$ and $\overline{x}_2$ are independent of each other, Equation (12) can be rewritten as $$d_{min}^2(P) = \min_{\overline{x}_{1,c}, \overline{x}_{1,e} \in Q} \left\| [h_{P,1}^\theta\ h_{P,2}^\theta] \begin{bmatrix} \Re[\overline{x}_{1,c} - \overline{x}_{1,e}] \\ \Im[\overline{x}_{1,c} - \overline{x}_{1,e}] \end{bmatrix} \right\|^2 + \tag{13}$$

$$\min_{\overline{x}_{2,c}, \overline{x}_{2,e} \in Q} \left\| [h_{P,3}^\theta\ h_{P,4}^\theta] \begin{bmatrix} \Re[\overline{x}_{2,c} - \overline{x}_{2,e}] \\ \Im[\overline{x}_{2,c} - \overline{x}_{2,e}] \end{bmatrix} \right\|^2$$

Furthermore, it is noted that the first term on the right-hand side of Equation (13) has the same minimum distance as the second term since the geometrical relationship between $h_{P,1}^\theta$ and $h_{P,2}^\theta$ remains the same as that between $h_{P,3}^\theta$ and $h_{P,4}^\theta$ (i.e., $\|h_{P,1}^\theta\| = \|h_{P,3}^\theta\|$, $\|h_{P,2}^\theta\| = \|h_{P,4}^\theta\|$, and $h_{P,1}^\theta \cdot h_{P,2}^\theta = h_{P,3}^\theta \cdot h_{P,4}^\theta$). This symmetry means that, in the computation of the minimum distance, there is a need to consider only one of the two terms in Equation (13) while assuming that the other term is zero. In other words, it is possible to set $\overline{x}_{2,c} = \overline{x}_{2,e}$ while $d_{min}^2(P)$ is computed with $\overline{x}_{1,c} \neq \overline{x}_{1,e}$. Let a difference vector defined as $e(\overline{x}_c, \overline{x}_e) = [\Re[\overline{x}_c - \overline{x}_e]\ \Im[\overline{x}_c - \overline{x}_e]]^t$ with $\overline{x}_c \neq \overline{x}_e$. Then, Equation (13) can be simplified as $$d_{min}^2(P) = \min_{\bar{x}_c, \bar{x}_e \in Q} \|[ h_{P,1}^\theta \quad h_{P,2}^\theta ] e(\bar{x}_c, \bar{x}_e)\|^2 \quad (14)$$

It is clear that the computation of $d_{min}^2(P)$ in Equation (14) requires a search over $$\binom{M_c}{2} = \frac{M_c(M_c-1)}{2}$$

vectors.

Figure 3:
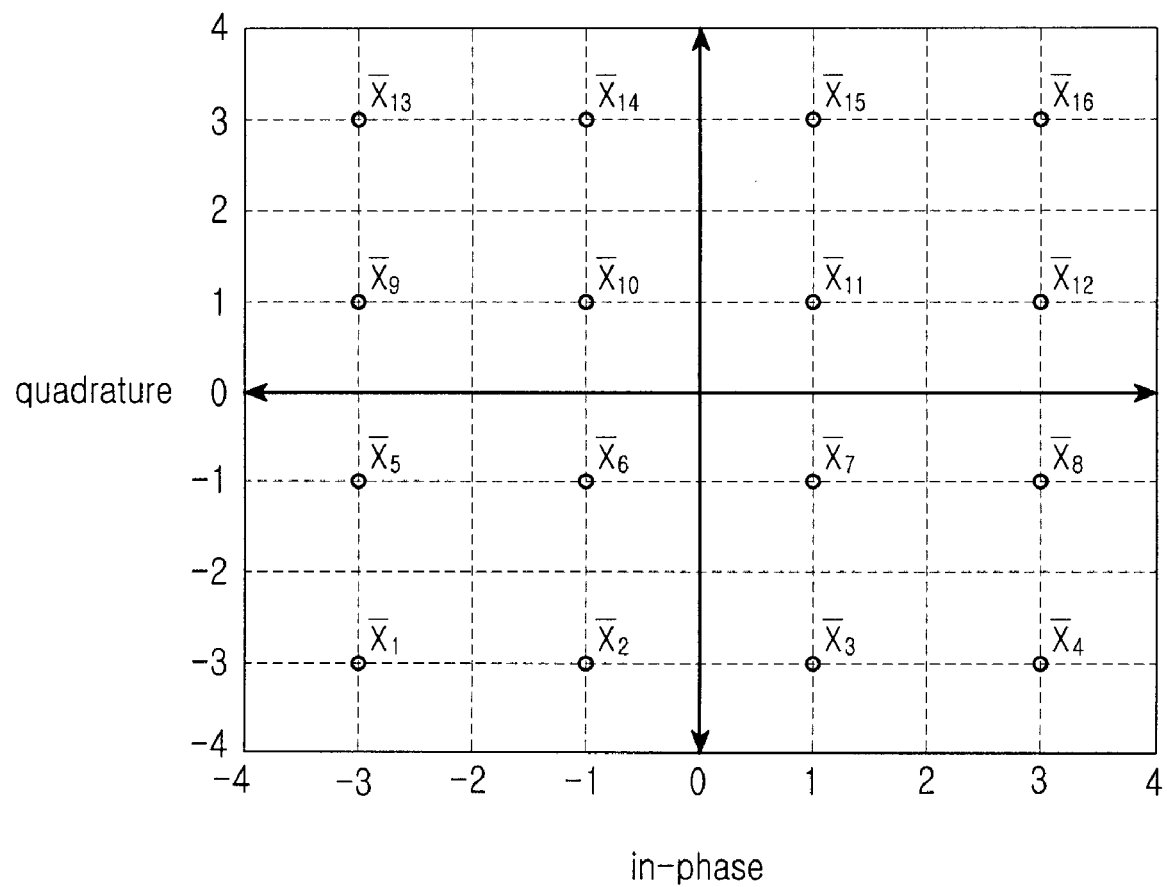
FIG. 3 illustrates a 16-ary Quadrature Amplitude Modulation (16QAM) constellation showing that the set of difference vectors for a search can be noticeably reduced according to an embodiment of the present invention.

FIG. 3 illustrates a 16-ary Quadrature Amplitude Modulation (16QAM) constellation showing that the set of difference vectors for a search can be noticeably reduced according to an embodiment of the present invention.

Referring to FIG. 3, it can be understood that the computational complexity can be further reduced. Considering the symmetries in uniform QAM constellations, it is possible to significantly reduce the set of difference vectors to search in Equation (14). For illustrative purposes, 16QAM is considered as shown in FIG. 3. It is noted that, among all possible $\binom{16}{2}=120$ difference vectors $e(\bar{x}_c, \bar{x}_e)$, there exist many equal and collinear difference vectors. For example, pairs $(\bar{x}_4, \bar{x}_6)$ and $(\bar{x}_{12}, \bar{x}_{14})$ yield the same difference vectors $(e(\bar{x}_4, \bar{x}_6) = e(\bar{x}_{12}, \bar{x}_{14}))$ while pairs $(\bar{x}_4, \bar{x}_{16})$ and $(\bar{x}_4, \bar{x}_7)$ are related as collinear difference vectors $(e(\bar{x}_4, \bar{x}_{10}) = 2e(\bar{x}_4, \bar{x}_7))$. Then, by excluding these equal and collinear difference vectors, there exist only 18 distinct difference vectors where $\bar{x}_1$ and $\bar{x}_4$ are set as the correct symbol $\bar{x}_c$.

Figure 4A:
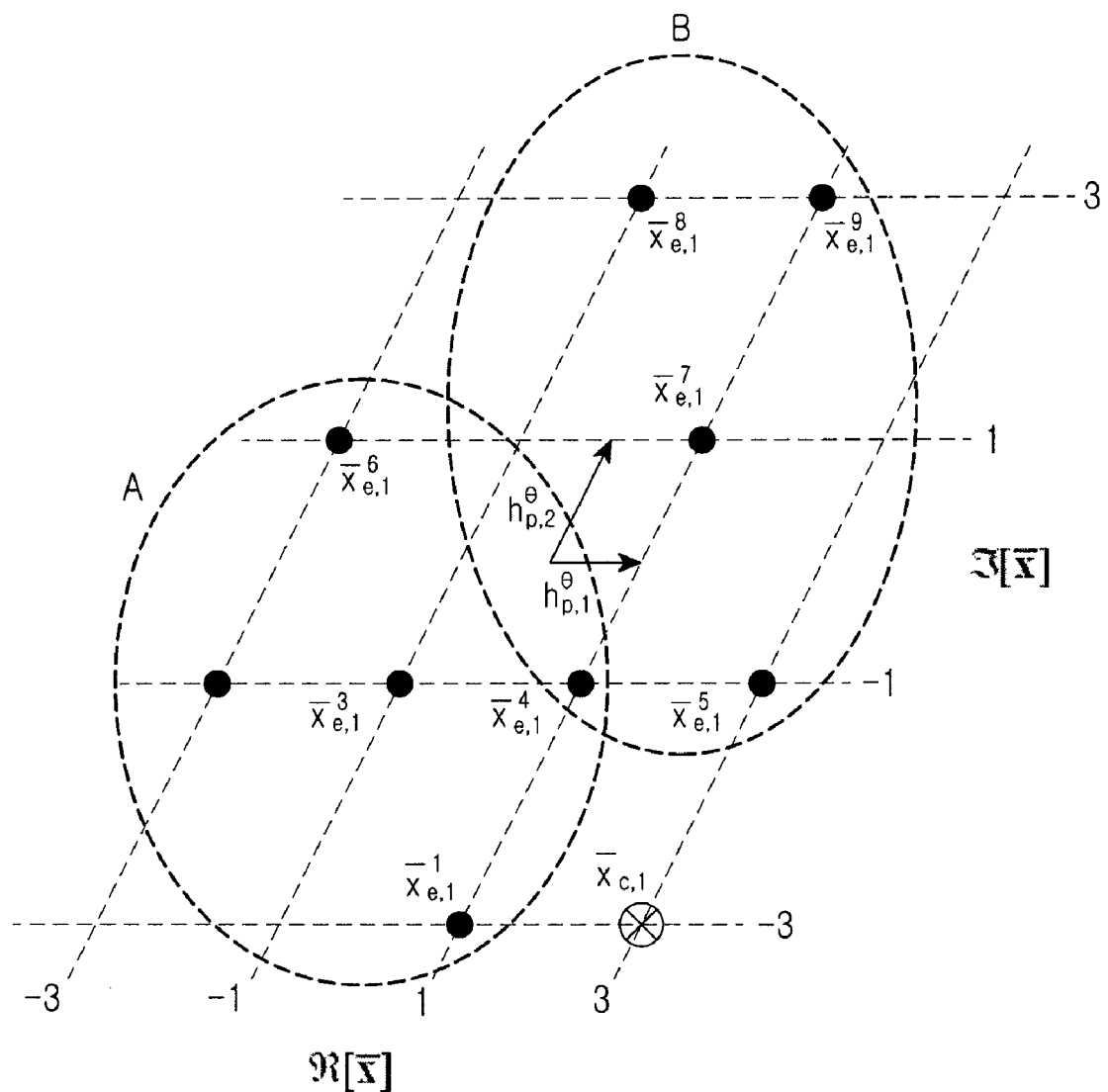
FIGS. 4A and 4B illustrate the reduced set of difference vectors in the receive constellation for $\bar{H}_p^\theta$ according to an embodiment of the present invention.
Figure 4B:
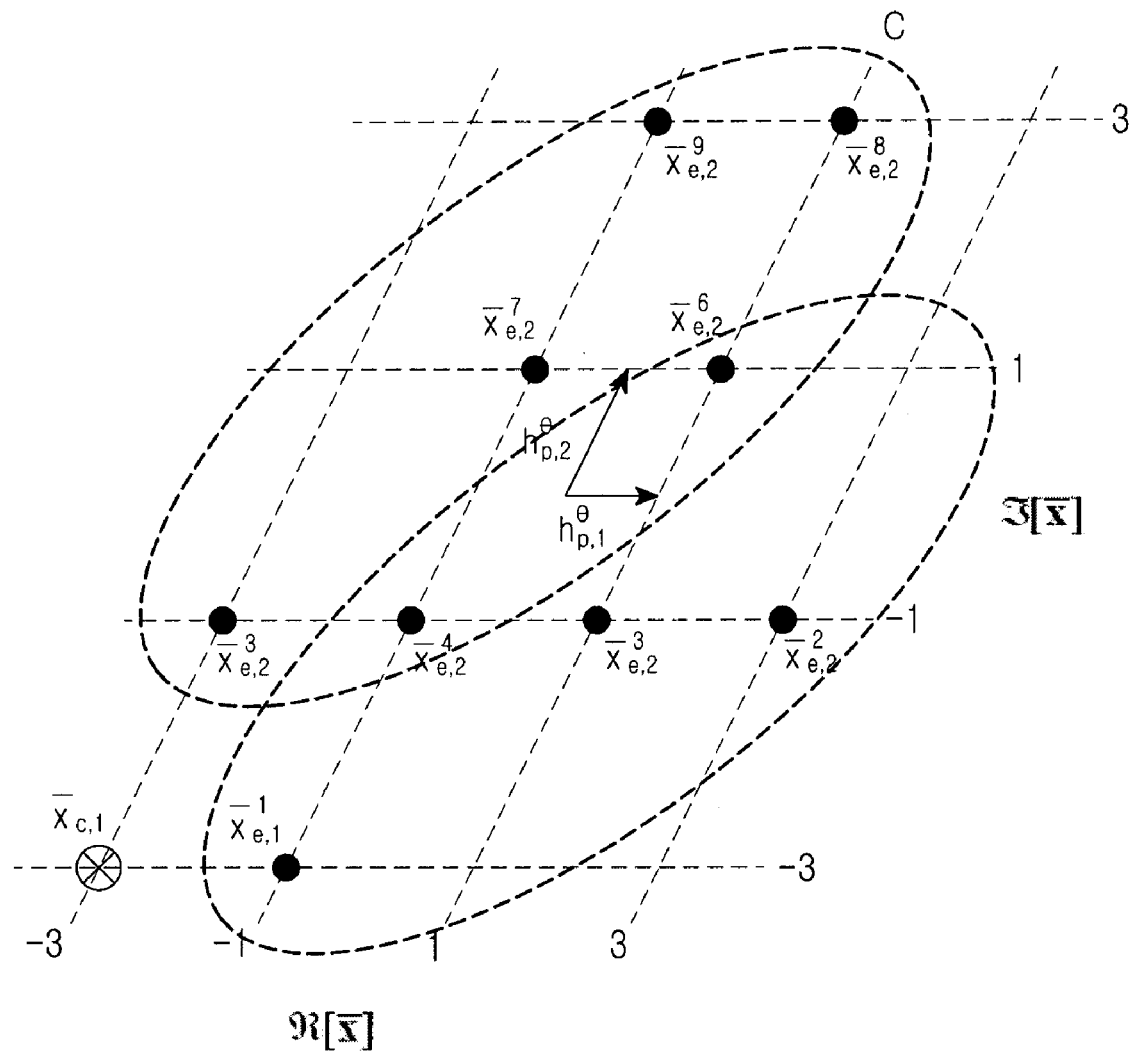

The corresponding pairs are illustrated as $(\bar{x}_{c,i}, \bar{x}_{e,i}^k)$ for $i \in \{1,2\}$ and $k \in \{1,2,\ldots,9\}$ in FIGS. 4A and 4B.

FIGS. 4A and 4B illustrate the reduced set of difference vectors in the receive constellation for $\bar{H}_P^\theta$ according to an embodiment of the present invention.

Referring to FIGS. 4A and 4B, the real and imaginary parts of the complex-valued symbols $\bar{x}_{c,i}$ and $\bar{x}_{e,i}^k \in \{\pm 3 \pm j3, \pm 3 \pm j1, \pm 1 \pm j3, \pm 1 \pm j1\}$ are displayed in real vector space with the basis vectors $h_{P,1}^\theta$ and $h_{P,2}^\theta$, resulting in the tilted receive constellation. In this case, the distance from a point $\bar{x}_{c,i}$ to a point $\bar{x}_{e,i}^k$ in the figure corresponds to the Euclidean distance $\|[h_{P,1}^\theta \quad h_{P,2}^\theta] e(\bar{x}_{c,i}, \bar{x}_{e,i}^k)\|$.

Depending on the channel's geometrical properties such as the norm and the inner product of $h_{P,1}^\theta$ and $h_{P,2}^\theta$, it is possible to determine the set $\hat{X}_{c-e}$ of $e(\bar{x}_c, \bar{x}_e)$ which is actually used in the computation of $d_{min}^2(P)$ without any performance degradation. There are four different cases that need to be considered to determine $\hat{X}_{c-e}$. Those four cases are listed in Table 1. As an example, the present invention considers the case of $h_{P,1}^\theta \cdot h_{P,2}^\theta \geq 0$ (i.e., the angle between $h_{P,1}^\theta$ and $h_{P,2}^\theta$ is less than or equal to $\pi/2$) and $\|h_{P,1}^\theta\| \leq \|h_{P,2}^\theta\|$, which makes the receive constellation look like the one depicted in FIGS. 4A and 4B. It is clear in FIGS. 4A and 4B that the first condition $h_{P,1}^\theta \cdot h_{P,2}^\theta \geq 0$ guarantees $\|[h_{P,1}^\theta \quad h_{P,2}^\theta] e(\bar{x}_{c,1}, \bar{x}_{e,1}^k)\| \leq \|[h_{P,1}^\theta \quad h_{P,2}^\theta] e(\bar{x}_{c,2}, \bar{x}_{e,2}^k)\|$ for any k. In this case, there is only a need to consider 9 pairs of $(\bar{x}_{c,1}, \bar{x}_{e,1}^k)$ in FIG. 4A. Meanwhile, the latter condition $\|h_{P,1}^\theta\| \leq \|h_{P,2}^\theta\|$ promises that $\|[h_{P,1}^\theta \quad h_{P,2}^\theta] e(\bar{x}_{c,1}, \bar{x}_{e,1}^{k_1})\| \leq \|[h_{P,1}^\theta \quad h_{P,2}^\theta] e(\bar{x}_{c,1}, \bar{x}_{e,1}^{k_2})\|$ for $(k_1, k_2) \in \{(1,5), (2,9), (3,7), (6,8)\}$ since the points in the lower left part in FIG. 4A are closer to $\bar{x}_{c,1}$ than those in the upper right part. As a result, under these two conditions, $d_{min}^2(P)$ can be obtained by searching only 5 pairs of $(\bar{x}_{c,1}, \bar{x}_{e,1}^k)$ within Circle A in FIG. 4A. It is possible to generalize the candidate pairs $(\bar{x}_c, \bar{x}_e)$ for the set $\hat{X}_{c-e}$ as listed in Table 1. Finally, $d_{min}^2(P)$ can be expressed as $$d_{min}^2(P) = \min_{e(\bar{x}_c, \bar{x}_e) \in \hat{X}_{c-e}} \|[ h_{P,1}^\theta \quad h_{P,2}^\theta ] e(\bar{x}_c, \bar{x}_e)\|^2 \quad (15)$$

which facilitates a search for the optimal antenna subset P*.

As a consequence, the optimal subset P* from the entire set $P(M_t, 2)$ is obtained as $$P^* = \arg\max_{P \in P(M_t, 2)} d_{min}^2(P)$$

That is, the optimal antenna subset P* is selected with the set of maximizing the minimum Euclidean distance.

Therefore, as described above, if the receiver transmits the rotation angle θ and the optimal antenna subset P* to the transmitter, the transmitter beam-forms its antennas using the rotation angle θ and the optimal antenna subset P* received from the receiver, and transmits the data streams to the receiver. In this manner, the proposed spatial multiplexing scheme reduces the size of the set of candidate vectors in computing $d_{min}^2(P)$ from 120, 32640, and 8386560 to 2, 5, and 19 for QPSK, 16QAM and 64QAM, respectively, as Equation (12) for the minimum Euclidean distance is equivalent to Equation (15). Therefore, it is evident that the computational savings in the proposed scheme are substantial.

TABLE 1

CANDIDATE PAIRS OF $(\bar{x}_c, \bar{x}_e)$ FOR THE SET $\hat{X}_{c-e}$ OF $e(\bar{x}_c, \bar{x}_e)$

| Case | Mod | $(\Re[\bar{x}_c], \Im[\bar{x}_c])$ | $(\Re[\bar{x}_e], \Im[\bar{x}_e])$ |
|---|---|---|---|
| $h_{P,1}^\theta \cdot h_{P,2}^\theta \geq 0$, | QPSK | (1, −1) | (−1, ±1) |
| $\|h_{P,1}^\theta\| \leq \|h_{P,2}^\theta\|$ | 16QAM | (3, −3) | (−3, ±1), (±1, −1), (1, −3) (points within Circle A in FIG. 3) |
| | 64QAM | (7, −7) | (−7, ±5), (−7, ±3), (−7, ±1), (5, −7), (±5, −5), (−5, 3), (±3, −5), (−3, −3), (−3, ±1), (±1, −5), (1, −3), (−1, −1) |
| $h_{P,1}^\theta \cdot h_{P,2}^\theta \geq 0$, | QPSK | (1, −1) | (±1, 1) |
| $\|h_{P,1}^\theta\| > \|h_{P,2}^\theta\|$ | 16QAM | (3, −3) | (±1, 3), (1, ±1), (3, −1) (points within Circle B in FIG. 3) |
| | 64QAM | (7, −7) | (7, −5), (±5, 7), (5, ±5), (5, ±3), (5, ±1), (±3, 7), (−3, 5), (3, 3), (3, −1), (±1, 7), (±1, 3), (1, 1) |
| $h_{P,1}^\theta \cdot h_{P,2}^\theta < 0$, | QPSK | (−1, −1) | (±1, 1) |
| $\|h_{P,1}^\theta\| > \|h_{P,2}^\theta\|$ | 16QAM | (−3, −3) | (±1, 3), (−1, ±1), (−3, −1) (points within Circle C in FIG. 3) |
| | 64QAM | (−7, −7) | (−7, −5), (±5, 7), (−5, ±5), (−5, ±3), (−5, ±1), (±3, 7), (−3, 3), (−3, −1), (3, 5), (±1, 7), (±1, 3), (−1, 1) |

TABLE 1-continued

CANDIDATE PAIRS OF $(\bar{x}_e, \bar{x}_c)$ FOR THE SET $\bar{X}_{c,e}$ OF $e(\bar{x}_e, \bar{x}_c)$

| Case | Mod | $(\Re[\bar{x}_e], \Im[\bar{x}_e])$ | $(\Re[\bar{x}_c], \Im[\bar{x}_c])$ |
|---|---|---|---|
| $h_{P,1}{}^\theta \cdot h_{P,2}{}^\theta < 0$, $\|h_{P,1}{}^\theta\| \leq \|h_{P,2}{}^\theta\|$ | QPSK | (−1, −1) | (1, ±1) |
| | 16QAM | (−3, −3) | (3, ±1), (±1, −1), (−1, −3) (points within Circle D in FIG. 3) |
| | 64QAM | (−7, −7) | (7, ±5), (7, ±3), (7, ±1), (−5, −7), (±5, −5), (5, 3), (±3, −5), (3, −3), (3, ±1), (±1, −5), (−1, −3), (1, −1) |

Figure 5:
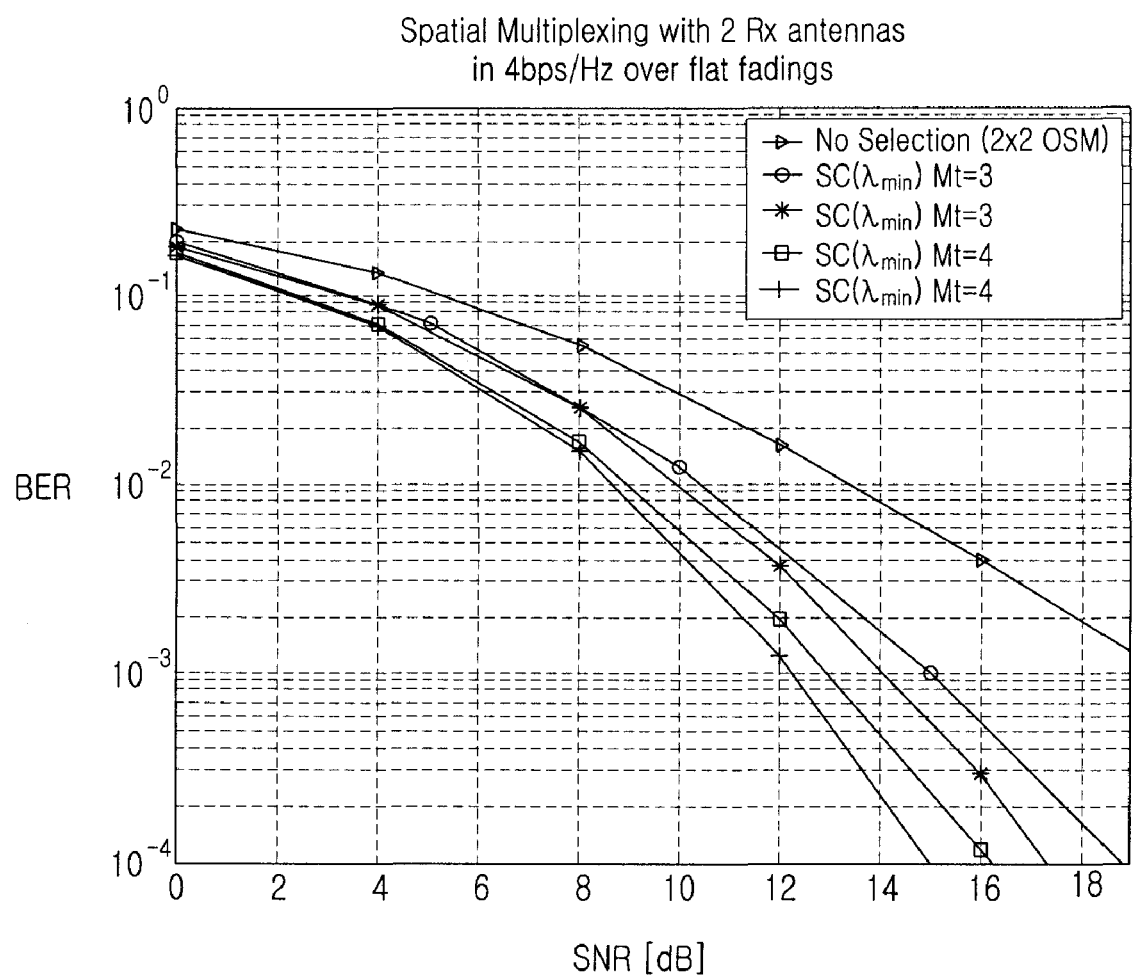
FIG. 5 illustrates the simulation results showing the performance of the OSM combined with the proposed antenna selection according to an embodiment of the present invention.

FIG. 5 illustrates the simulation results showing the performance of the OSM combined with the proposed antenna selection according to an embodiment of the present invention.

The number of transmitted data streams is fixed to two in all simulations and the optimum antenna subset is chosen based on the minimum Euclidean distance in the OSM systems as described above. For a fair comparison, the present invention assumes an ML receiver for all systems.

Shown in FIG. 5 is a graph illustrating the Bit Error Rate (BER) performance comparison between different antenna selection criteria for the OSM systems according to an embodiment of the present invention.

Referring to FIG. 5, the minimum Euclidean distance-based criterion (denoted by $SC(d_{min})$) and the minimum singular value-based criterion (denoted by $SC(\lambda_{min})$) are considered. In FIG. 5, three or four transmit antennas and two receive antennas are considered with 4QAM.

It is noted that the selection criterion $SC(\lambda_{min})$ is originally designed for linear receivers instead of ML receivers. In contrast, the minimum eigen value $\lambda_{min}$ provides a lower bound for the minimum distance criterion. As expected, the OSM system using $SC(d_{min})$ performs 1.3 dB better than $SC(\lambda_{min})$ at a BER of $10^{-4}$. Thus, from now on, the present invention considers the selection criterion $SC(d_{min})$ for the OSM system.

Figure 6:
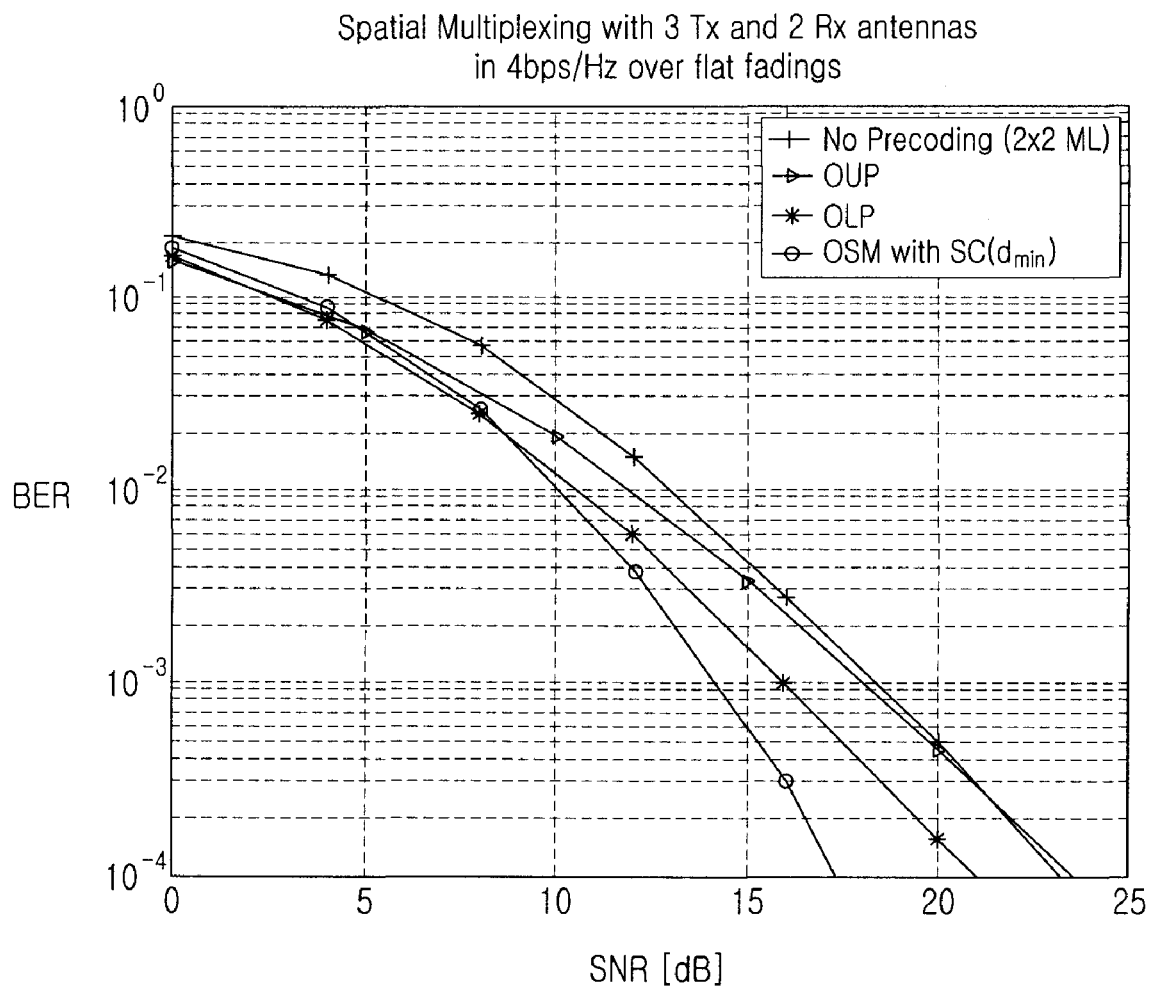
FIG. 6 illustrates the BER performance comparison of the spatial multiplexing schemes with $M_t=3$ and $M_r=2$ for 4QAM.
Figure 7:
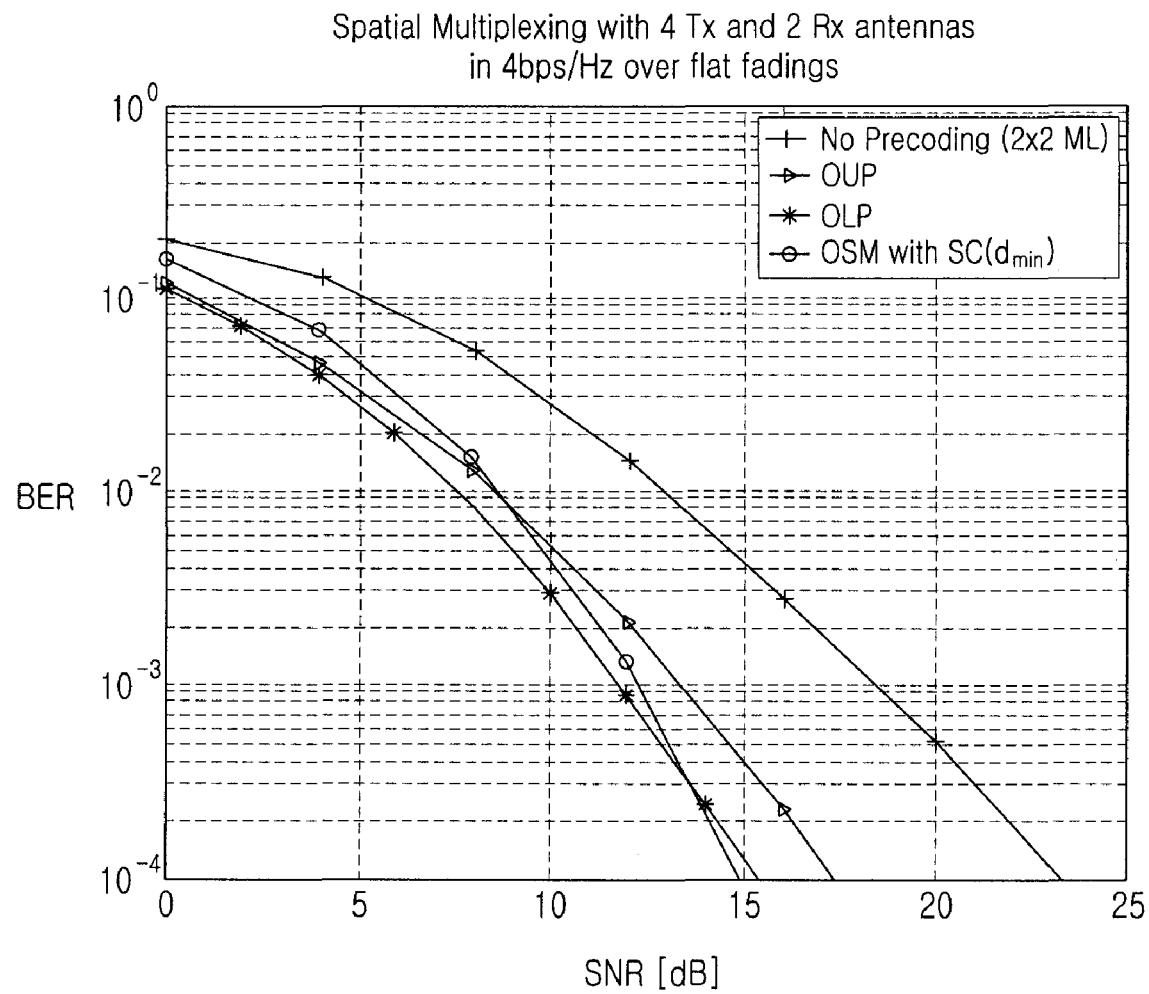
FIG. 7 illustrates the BER performance comparison of the spatial multiplexing schemes with $M_t=4$ and $M_r=2$ for 4QAM.

FIGS. 6 and 7 illustrate the BER comparison of the OSM and two optimal precodings: Optimal Unitary Precoding (OUP) and Optimal Linear Precoding (OLP) with $M_r=2$ and 4QAM according to an embodiment of the present invention. Specifically, FIG. 6 illustrates the BER performance comparison of the spatial multiplexing schemes with $M_t=3$ and $M_r=2$ for 4QAM, and FIG. 7 illustrates the BER performance comparison of the spatial multiplexing schemes with $M_t=4$ and $M_r=2$ for 4QAM.

Referring to FIGS. 6 and 7, the two optimal precodings include Optimal Unitary Precoding (OUP) and Optimal Linear Precoding (OLP) with $M_r=2$ and 4QAM. For comparison purposes, the invention also plot the performance of the 2×2 spatial multiplexing with ML decoding at the receiver where the number of the search candidates for the ML decoding is $M_c^2$ without any precoding. For the $M_t=3$ case presented in FIG. 6, it can be seen that the OSM provides a 4-dB gain at a BER of $10^{-3}$ over the no precoding case. More importantly, FIG. 6 shows that the OSM outperforms both the OUP and OLP cases by 1.8 dB and 3.8 dB, respectively. As the number of transmit antennas increases to 4 as in FIG. 7, the selection gain of the OSM grows up to 7 dB compared to the 2×2 ML case.

The benefit of increasing the number of transmit antennas is more pronounced for OUP and OLP since these precodings exploit available MIMO spatial diversity gains better than the simple spatial multiplexing. Nonetheless, the OSM performs within 1 dB of the OLP and still outperforms the OUP by 1 dB.

It should be noted that in the conventional preceding systems there is a need to compute the preceding matrix by performing the SVD operation and the power allocation matrix that determines the power distribution among the spatial modes. Moreover, these linear precodings involve complex-valued matrix-matrix and/or matrix-vector multiplications at the transmitter. Thus, the computation complexities of OLP and OUP are substantially higher than the OSM with the proposed antenna selection method.

As for the feedback overhead, our scheme needs only a single phase value feedback, while the conventional preceding schemes require much larger feedback information in sending back the entire channel or preceding matrix, especially including the power allocation matrix for the OLP.

Figure 8:
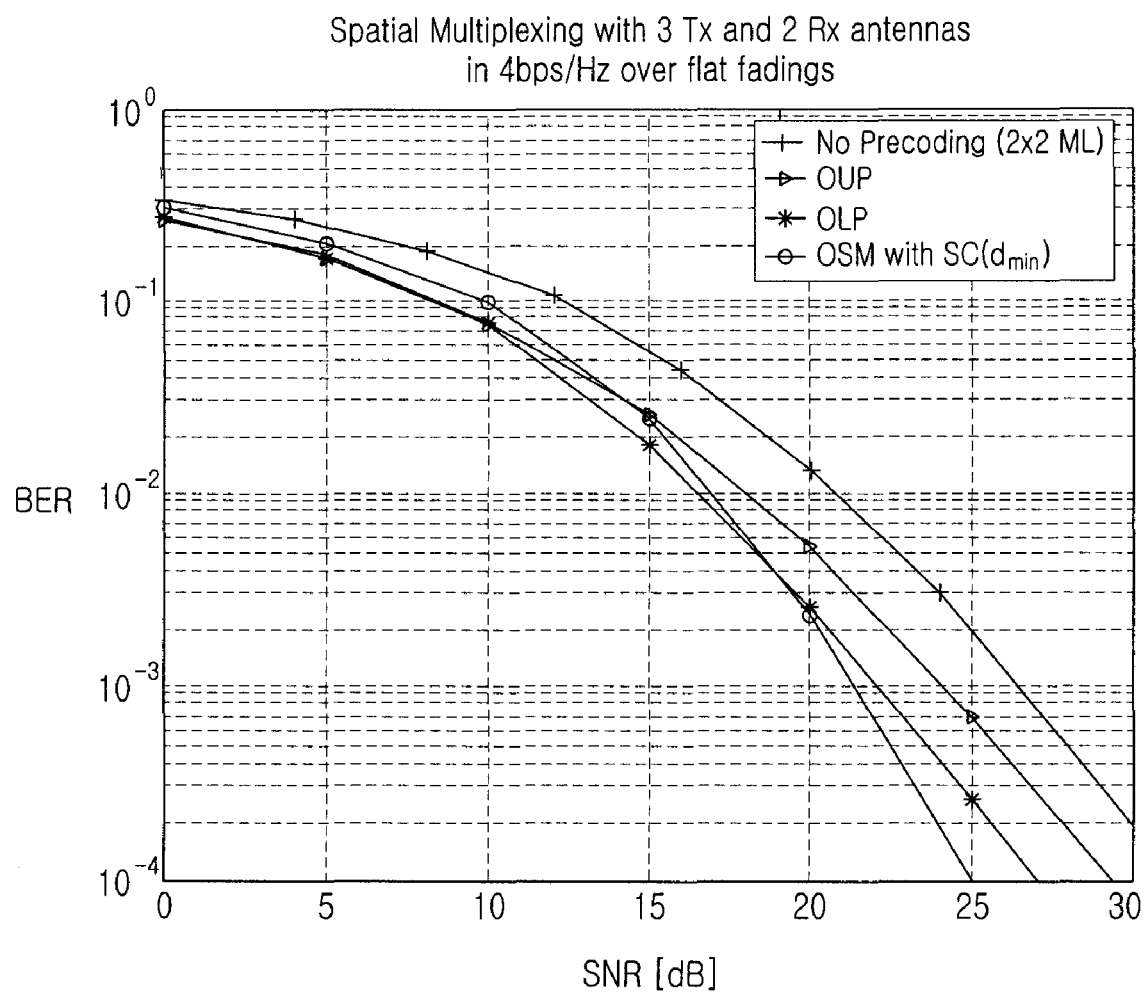
FIG. 8 illustrates the BER performance comparison of spatial multiplexing schemes for 16QAM constellation with $M_t=3$ and $M_r=2$ according to an embodiment of the present invention.

FIG. 8 illustrates the BER performance comparison of spatial multiplexing schemes for 16QAM constellation with $M_t=3$ and $M_r=2$ according to an embodiment of the present invention.

Referring to FIG. 8, the OSM with the proposed antenna selection method outperforms the OLP by about 2 dB in the high SNR regime with much reduced complexity and overhead.

A description has been made of the new orthogonalized spatial multiplexing scheme for MIMO systems which minimizes the overall complexity, and then a study has been made of a criterion to choose the subset of transmit antennas that maximizes the minimum Euclidean distance of the receive constellation in the orthogonalized spatial multiplexing system. Motivated by the fact that the computation of the minimum Euclidean distance requires a search over multidimensional constellations, the invention substantially reduces the candidate search size of difference vectors in the orthogonalized spatial multiplexing system and presents the reduced set of difference vectors for each constellation. The simulation results confirm that the orthogonal spatial multiplexing scheme combined with the proposed antenna selection method is quite effective in approaching the performance of the optimal linear precoding with a significantly reduced complexity and feedback amount.

As can be appreciated from the foregoing description, the present invention can provide an apparatus and method for selecting antennas in a Spatial Multiplexing (SM) system that requires only a single phase value from an ML receiver to reduce the processing complexity of the receiver.

In addition, according to the present invention, the receiver transmits an optimal antenna subset of the transmitter to the transmitter, thereby reducing overhead of the feedback information and also reducing the complexity of detecting the data symbols transmitted by the transmitter.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for selecting a transmit antenna of a transmitter by a receiver in an orthogonalized spatial multiplexing system, the method comprising:

upon receipt of symbols from the transmitter with multiple transmit antennas, decoding each of the received symbols;

determining a rotation angle in order that columns of an effective channel matrix for the received symbols have orthogonality, and determining an optimal subset for the multiple transmit antennas using the determined rotation angle and a distance between the decoded symbols; and generating feedback information including the determined rotation angle and the determined optimal subset, and transmitting the generated feedback information to the transmitter, wherein the rotation angle is determined depending on first channel responses between a first transmit antenna and multiple receive antennas and second channel responses between a second transmit antenna and the multiple receive antennas, wherein the determining the optimal subset comprises determining the optimal subset for the multiple transmit antennas by means of a set of maximizing a squared minimum distance between the decoded symbols, and wherein a distance between the decoded symbols is determined by using difference vectors excluding difference vectors having a same value from each other and collinear difference vectors, among difference vectors in a constellation.

2. The method of claim 1, further comprising:

after transmitting the generated feedback information to the transmitter, detecting each of data symbols received from at least one of the multiple transmit antennas of the transmitter.

3. The method of claim 1, wherein the difference vectors for determining the distance between the decoded symbols are determined based on channel properties of the multiple transmit antennas of the transmitter and multiple receive antennas of the receiver.

4. The method of claim 3, wherein the channel property comprises orthogonality and symmetry of a subspace spanned by the effective channel matrix.

5. The method of claim 1, wherein the optimal subset is determined based on the determined rotation angle by means of the set of maximizing the squared minimum distance between two symbols.

6. The method of claim 1, wherein the decoding is Maximum-Likelihood (ML) decoding.

7. An apparatus for selecting a transmit antenna of a transmitter in a receiver of an orthogonalized spatial multiplexing system, the apparatus comprising:

at least one decoder for, upon receipt of symbols from the transmitter with multiple transmit antennas, decoding the received symbols; and an antenna selector for determining a rotation angle in order that columns of an effective channel matrix for the received symbols have orthogonality, determining an optimal subset for the multiple transmit antennas using a distance between vectors of the decoded symbols, generating feedback information including the determined rotation angle and the determined optimal subset, and transmitting the generated feedback information to the transmitter, wherein the rotation angle is determined depending on first channel responses between a first transmit antenna and multiple receive antennas and second channel responses between a second transmit antenna and the multiple receive antennas, wherein the antenna selector determines the optimal subset for the multiple transmit antennas by means of a set of maximizing a squared minimum distance between the decoded symbols, and wherein a distance between the decoded symbols is determined by using difference vectors excluding difference vectors having a same value from each other and collinear difference vectors, among difference vectors in a constellation.

8. The apparatus of claim 7, wherein after transmitting the generated feedback information to the transmitter, the at least one decoder detects each of data symbols received from at least one of the multiple transmit antennas of the transmitter.

9. The apparatus of claim 7, wherein the difference vectors for determining the distance between the decoded symbols are determined based on channel properties of the multiple transmit antennas of the transmitter and multiple receive antennas of the receiver.

10. The apparatus of claim 9, wherein the channel property comprises orthogonality and symmetry of a subspace spanned by the effective channel matrix.

11. The apparatus of claim 7, wherein the optimal subset is determined based on the determined rotation angle by means of the set of maximizing the squared minimum distance between two symbols.

* * * * *